W. M. Parker.
Fire Annihilator.
N° 102,582. Patented May 3, 1870.

Witnesses.
W. J. Johnson.
Alden Fink.

Inventor:
Wm. M. Parker.

United States Patent Office.

WILLIAM M. PARKER, OF BOSTON, MASSACHUSETTS.

Letters Patent No. 102,582, dated May 3, 1870; antedated April 19, 1870.

IMPROVED FIRE-EXTINGUISHER.

The Schedule referred to in these Letters Patent and making part of the same.

Be it known that I, WILLIAM M. PARKER, of the city of Boston, in the county of Suffolk and State of Massachusetts, have invented an Improved Fire-Extinguisher, of which the following is a full, clear, and exact description, reference being had to the accompanying drawings making a part of this specification, in which—

Figure 2:
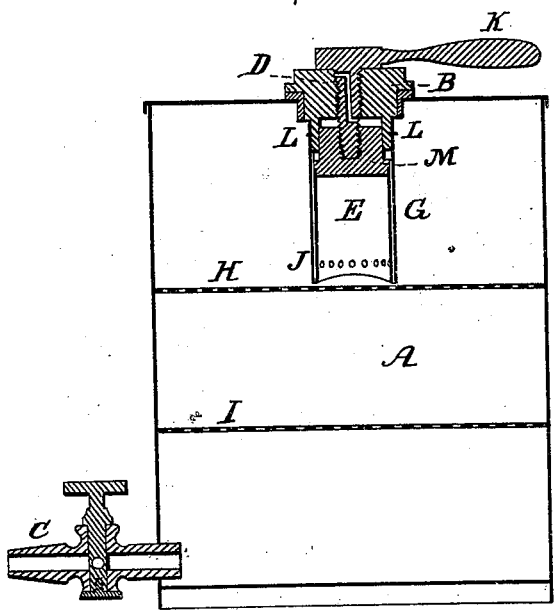
Figure 2 is a vertical central section of the same.

My invention relates to that class of portable chemical fire extinguishers in which the acid and alkaline ingredients are kept separate, wholly or mainly, until the occasion occurs for using the apparatus, when they are suddenly brought together, and the carbonic acid eliminated, with greater or less rapidity, according to the conditions under which such chemical union is effected.

The main object to be obtained in this class of fire-extinguishers is the quick neutralization of the chemical ingredients, and consequent elimination of all the carbonic acid due to the charge. If the escape-cock be opened before the chemical action is completed, a portion of one or both of the ingredients will be thrown out unneutralized, and a corresponding reduction of the volume of gas calculated upon when the machine was charged, and, of course, regarded as essential to its most efficient use, must result. Besides, if the acid goes out unneutralized, it is liable to do damage in many cases by being thrown upon fine and costly fabrics, or other articles, or into some one's eyes.

Such an apparatus is unfit to meet the emergencies it is designed to meet, if more than about a quarter of a minute is required to complete chemical action, after the ingredients are brought together.

The time required should be so brief as to remove the liability, if possible, that the escape-cock will be opened, under the excitement of an alarm of fire, before the contents of the machine are in a proper condition to be discharged.

The ingredients should be employed in due chemical proportion, that the contents when discharged may be neither acid nor alkaline. For obvious reasons the carbonate should be dissolved in the water with which the main receptacle is filled, and the acid in liquid form, should be contained in a smaller vessel or compartment inside the main vessel, to be discharged into the alkaline solution, when the occasion occurs for bringing them together.

Now if the acid be set at liberty at the bottom of the vessel containing the alkaline solution, agreeably to a method which has been to some extent heretofore adopted, a large portion of it remains at the bottom for a considerable length of time, being much heavier than the alkaline solution, and before chemical action is completed, every drop of the alkaline solution must be brought to the bottom of the vessel, or near to it, and into contact with the acid. This requires too much time to meet the emergencies of the case.

If the acid be liberated in the upper part of the vessel and allowed to fall through the alkaline solution unobstructed, the most of it reaches the bottom unneutralized, and the results are nearly the same as when the acid is liberated at the bottom of the vessel.

An obvious improvement on both the methods above named is, to distribute the acid in very fine divisions or fine streams throughout every part of the alkaline solution, so that chemical action may ensue in all parts of it at nearly the same moment. In this way complete chemical action may be effected in a few seconds of time.

A neutralization sufficiently rapid to meet the necessities of the case and greatly in advance, as to the time required, of any result attainable by any method heretofore employed, is secured by liberating the acid in the upper part of the main vessel, and retarding its descent, and breaking up and finely distributing it throughout the alkaline solution by means of one or more finely perforated plates or diaphragms placed across the inside of the main vessel below the acid vessel, one above the other, if more than one be used.

When two plates are employed, dividing the vessel into three nearly equal divisions, and the acid is liberated above the upper plate, the main body of it falls at once upon this upper plate, and being obstructed in its descent spreads quickly over the plate, a portion of it at the same time passing through in fine streams into the middle division, and all that is not neutralized in that portion of the solution reaches the lower plate, and passes through it into the lower division.

Before all the acid gets through the upper plate there is time for complete neutralization of the carbonate held in solution in the upper division of the main vessel, which disposes of about one-third of the acid charge, and the other two-thirds passing on, is distributed in due proportion through the other divisions.

So quickly does the heavy unneutralized acid fall through the water that chemical action commences almost at the same moment in all parts of the vessel, and the work is speedily completed.

This statement may be, in a measure, verified, by nearly filling a tall glass vessel with water, and then pouring into it sulphuric acid, and observing how quickly the acid sinks to the bottom and accumulates there, leaving but a trace in the water occupying the upper part of the vessel, and observing also that the heat arising from the union of the acid with the water is confined to the lower part of the vessel, while the temperature of the upper part is not perceptibly changed for a long time.

But when the acid is disengaged at or near the bottom of a vessel of water as tall as that of the common portable fire-extinguisher, instead of being introduced at or near the surface, and allowed to fall through the water, considerable time will elapse before the presence of the acid can be detected at all, in the upper part of the vessel, and if the water holds a carbonate in solution in due proportion, the acid will mostly remain at the bottom, notwithstanding the agitation caused by the liberation of the carbonic acid, until the solution is brought wholly into contact with it.

Another serious objection to this method of bringing the ingredients together is that the unneutralized acid accumulates at the bottom of the vessel, where the escape-cock is located, and will be first discharged in case the cock is opened before chemical action is completed, and is liable to pass out in sufficient strength to injure almost anything it may be thrown upon.

Another important consideration is, the injury to the apparatus, which is sure to result from this method of charging it. Nearly the full charge of acid, with nearly its full strength, is brought into contact with the soldered joints about the bottom of the vessel, and the soldering about the stop-cock, and passes into the stop-cock, and is likely to remain there some time before it is deprived of its acid properties, unless the cock be prematurely opened, in which case still greater damage might be done by the passage of the acid or a strong solution of it, through the cock, hose, and jet-pipe.

No apparatus of this kind could be charged in this manner many times without being seriously injured or ruined. These objections are all obviated by the use of the perforated plates, and by liberating the acid in the upper part of the vessel, that it may fall through the alkaline solution, obstructed, divided, and finely distributed by the plates.

Another important use of these plates arises from the fact that the greater part of the carbonic acid is disengaged below one or both of them, and must pass through one or both if it reaches the upper part of the vessel, toward which it is strongly forced by its own buoyancy.

The plates not only obstruct the upward passage of the gas and keep it longer in contact with the main body of the water, but they break it up and finely divide it, and this, in connection with the agitation caused by the liberation of the gas and its violent struggle to rise through the water, occasions the absorption of a much larger portion of the gas by the water than would occur if the gas were allowed to rise freely through the water, and the more the water absorbs and carries on to the fire the greater is its efficiency in extinguishing the fire; and besides, the strain upon the apparatus arising from the rapid production of the carbonic acid is more or less relieved by the absorption of a portion of the gas by the water.

Figure 1:
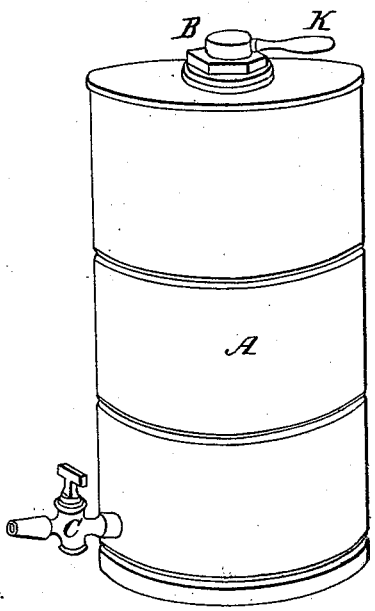
Figure 1 is a perspective view of my apparatus.

A, fig. 1, is a vessel of sheet metal, of about one cubic foot capacity, which should be of sufficient strength to withstand an inside pressure of two hundred and fifty pounds, or more, to the square inch.

The screw-plug B controls an opening in the top of the vessel, through which the contents are introduced, and C is the escape-cock, through which the contents are discharged.

Through the center of the screw-plug, lengthwise, a hole is drilled, large enough to receive the largest part of rod D, fig. 2, into which hole, or the upper part of it, the largest or upper part of rod D is to be screwed, bringing the head of the rod into contact with the upper end or face of the screw-plug.

The lower part of the hole through the screw-plug, below the point reached by the larger or upper part of rod D when screwed home, is enlarged, so as to receive, loosely, the extension of the bottom of the acid-vessel E, fig. 2, the depth of such enlarged part of the hole being about equal to the length of the part last named, marked m, fig. 2.

The lower and smaller part of rod D extends through to the inner end of the screw-plug, and is screwed with a left-hand thread into the end of the part marked m.

The vessel or device G, fig. 2, is used to close the mouth or open end of acid-vessel E, and to support the vessel in position.

The bottom of device G constitutes the stopper of acid-vessel E, and the support it furnishes the vessel is secured by its attachment to the lower or inner part of the screw-plug B.

H and I, fig. 2, shew in central section two perforated plates or diaphragms placed across the inside of the main vessel.

The screw-plug and its attachments being out, fill the main vessel with an alkaline solution. If the bicarbonate of soda be used, dissolve it in the water, in the proportion of about two and a half ounces to the gallon. Screw home rod D, with a lead washer under the head of it, to make a gas-tight joint. Pass another lead washer onto the lower or smaller part of the rod, and screw on after it acid-vessel E, a hole of suitable size having been drilled into the end of the extension of the bottom the full length of it, and a left-hand thread cut in the same. Leave a space between the bottom of the acid-vessel and the inner end of the screw-plug equal to the distance the vessel is to be raised from its stopper when its contents are to be discharged, which need not exceed one-fourth of an inch. Turn the open end of the acid-vessel up, with the screw-plug down. Pour the requisite quantity of acid into the acid-vessel. While the vessel is in this position, pass down over it the device G, the open end of it passing onto the inner end of the screw-plug, each of the pins L L, fig. 2, entering the vertical or longitudinal part of the corresponding slots in the sides of the device G at the open end of it, while the stopper at the opposite end enters the open end of the acid-vessel. The device G being now revolved on the screw-plug, the pins enter the oblique part of the slots, and the stopper is forced into the mouth of the acid-vessel with the mechanical purchase of an inclined plane. Pass the acid-vessel and its adjusts through the opening in the top of the main vessel, and screw in the screw-plug with a lead washer under its flange, to form a gas-tight joint.

When the occasion arises for using the machine, discharge the contents of the acid-vessel into the alkaline solution by unscrewing rod D, by means of handle K, until the operation is stopped by the end of extension m striking the shoulder formed by the enlargement of the hole in the screw-plug, where, by means of the lead washer before named, a gas-tight joint is formed, to serve the purpose of the outside joint, now opened by unscrewing rod D. The acid-vessel being raised, mouth downward, from its stationary stopper, the contents flow out, and, passing through lateral openings near the bottom of device G, to which the stopper is attached, falls upon the upper perforated plate or diaphragm, and neutralization of the chemical ingredients is speedily effected, the absorption of the gas by the water is increased, the accumulation of acid at the bottom of the vessel is avoided, and the strain on the apparatus is relieved, as hereinbefore stated and explained.

The thread on the lower part of rod D being lefthanded, the acid-vessel rises on it, as the rod rises through the screw-plug; and if the threads on the upper and lower part of the rod are of the same numbers to the inch, it is only required to raise the rod an eighth of an inch to raise the acid-vessel a quarter of an inch.

The passage lengthwise in the upper part of rod D, with an outlet at each end of it, by means of lateral holes drilled into it from the outside, is for the purpose of letting off gas when the pressure is too great. When the acid-vessel is either closed or fully opened, the gas has no access to this passage, but in any intermediate position the gas can escape through it.

If the pressure is too great at any time after the acid-vessel is opened, as above directed, it is only required to give the rod-handle a part of a turn to the right to reduce the pressure to any required extent.

This method of controlling the gas is essentially the same as that for the same purpose set forth in a patent granted to me the 6th day of April, 1869, for improvement in fire-extinguishers.

I claim—

1. In the construction of a portable chemical fire-extinguisher, a liquid-acid vessel, attached to a screw-plug in the top of the main receptacle, and introduced through the opening controlled by such screw-plug, mouth downward, closed with a stopper relatively stationary, such stopper being attached and held in positon independently of the acid-vessel, the contents of which are discharged by lifting the vessel from the stopper; in combination with the devices by which a gas-tight joint is formed on the inside of the screw-plug when the acid-vessel is opened; in combination, also, with one or more perforated plates or diaphragms placed within the main receptacle below the acid-vessel, to facilitate the neutralization of the acid and alkaline ingredients employed in charging the apparatus, and increase the absorption by the water of the carbonic acid disengaged, and to prevent the accumulation of liquid acid at the bottom of the main vessel, substantially as shown and described, and for the purposes set forth.

2. In a portable chemical fire-extinguisher, forming a gas-tight joint on the inside or inner part of the screw-plug controlling the main opening, substantially as shown and described, and for the purpose set forth.

3. In the construction of a portable chemical fire-extinguisher, one or more perforated plates, partitions, or diaphragms, placed within the main receptacle below the acid-vessel, when such plates, partitions, or diaphragms are employed to distribute liquid acid through an alkaline solution contained in the main vessel, to facilitate the neutralization of the acid and alkaline ingredients employed in charging the apparatus, and prevent the accumulation of acid at the bottom of the main vessel.

In testimony whereof I have hereunto subscribed my name.

WM. M. PARKER.

Witnesses:
W. J. JOHNSON,
ALDEN FRINK.